United States Patent
Hwang et al.

(10) Patent No.: US 6,414,723 B1
(45) Date of Patent: Jul. 2, 2002

(54) DOUBLE/MULTI WINDOW PROCESSING APPARATUS FOR TELEVISION SYSTEM

(75) Inventors: Young Hwan Hwang, Taegu; Jae Chul Jung, Kyeongsangbook-Do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/385,349

(22) Filed: Aug. 30, 1999

Related U.S. Application Data

(63) Continuation-in-part of application No. 08/982,321, filed on Dec. 2, 1997, now Pat. No. 5,963,270.

(51) Int. Cl.[7] .............................................. H04N 5/445
(52) U.S. Cl. ....................... 348/588; 348/599; 348/564
(58) Field of Search .................................. 348/563, 564, 348/565, 566, 569, 584, 588, 598, 599, 663, 665; H04N 5/445, 5/45

(56) References Cited

U.S. PATENT DOCUMENTS 5,815,216 A    9/1998   Suh ............................. 348/588
5,831,591 A   11/1998   Suh ............................. 345/115

Primary Examiner—Sherrie Hsia

(57) ABSTRACT

A double/multi window processing apparatus for a TV system is disclosed. The apparatus has a first luminance/chrominance separation unit for separating a luminance signal Ym and chrominance signal Cm from the combined image signals of the main image outputted from the intermediate frequency processing unit. A second luminance/chrominance separation unit separates the luminance and chrominance components from the combined image signals CVBS1 and CVBS2 of the main image and a sub-image outputted from the intermediate frequency processing unit and coincides the same. The second luminance/chrominance separation unit combines the synchronous-coincided luminance and chrominance signals and generates double window luminance Yp and chrominance Cp signals. A luminance/chrominance switching unit switches the luminance Yp and chrominance Cp signals of the first and second luminance/chrominance separation units and outputs one luminance Y and chrominance signal. An image processing unit receives the luminance and chrominance signals of the luminance/chrominance switching unit and displays the primary signals R, G and B on a display unit.

7 Claims, 4 Drawing Sheets

FIG. 3

| SYSTEM | VERTICAL FREQUENCY | SYSTEM OF COLOR TYPE | COLOR BURST OCCURRENCE OR NOT |
|---|---|---|---|
| | 60Hz:0<br>50Hz:0 | NTSC:0<br>PAL:1 | COLOR BURST OCCURRENCE:1<br>COLOR BURST NO OCCURRENCE:0 |
| NTSC | 0 | 0 | 1 |
| PAL-M | 0 | 1 | 1 |
| PAL-N | 1 | 1 | 0 |
| NO SIGNAL | 0 | 0 | 0 |
| SIGNAL WITH NO COLOR BURST | 1 | 1 | 0 |

| DOUBLE WINDOW | MAIN SCREEN SYSTEM | SUB-SCREEN SYSTEM |
|---|---|---|
| FORMAT1 | NTSC-M | NTSC-M |
| FORMAT2 | NTSC-M | PAL-N |
| FORMAT3 | PAL-N | NTSC-M |
| FORMAT4 | PAL-N | PAL-N |

FORMAT1

(B) 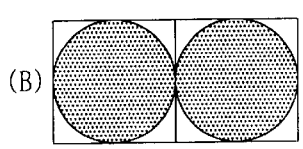

FORMAT2

(C) 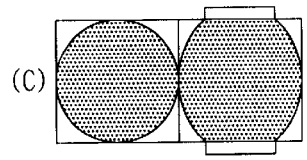

FORMAT3

(D) 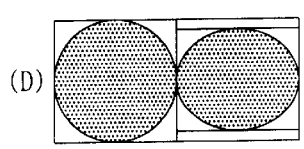

FORMAT4

(E) 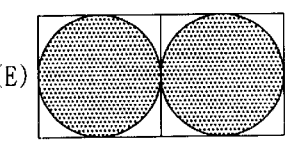

DOUBLE/MULTI WINDOW PROCESSING APPARATUS FOR TELEVISION SYSTEM

RELATED APPLICATIONS

This is a continuation-in-part of the U.S. application Ser. No. 08/982,321 filed Dec. 2, 1997, U.S. Pat. No. 5,963,270.

BACKGROUND OF THE INVENTION

1. Field of the Invention

The present invention relates to a double window processing apparatus for a television system, and in particular to an improved double/multi window processing apparatus for a television system which is capable of matching the synchronousnesses of a main image and a sub-image.

2. Description of the Background Art

As shown in FIG. 1, the conventional double window processing apparatus for a television system includes a main screen tuner 101 and a sub-screen tuner 104 receiving a high frequency signal inputted through an antenna ANT and outputting intermediate frequency signals IF1 and IF2, a main screen intermediate frequency processor 105 and a sub-screen intermediate frequency processor 102 processing the output signals from the main screen tuner 101 and the sub-screen tuner 104 and outputting combined image signals CVBS1 and CVBS2, a digital comb filter 103 for receiving the output signal CVBS1 from the main screen intermediate frequency processor 102 and separating the thusly received signal into a luminance signal Ym and a chrominance signal Cm, a double window processor 106 receiving the output signal CVBS2 of the sub-screen intermediate frequency processor 105 and separating the thusly received signal into a luminance signal Yp and a chrominance signal Cp, a luminance/chrominance switching unit 107 switching the luminance signal Ym and the chrominance signal Cm of the digital comb filter 103 and the luminance signal Yp and the chrominance signal Cp of the double window processor 106 and outputting one luminance signal Y and one chrominance signal C, and an image processor 108 receiving an output signal Y/C of the luminance/chrominance switching unit 107 and outputting primary color signals R, G, B to a CPT.

The operation of the above-described conventional television system will be explained.

The tuner 101 receives a high frequency signal such as NTSC-M, PAL-M, PAL-N through the antenna ANT and inputs the intermediate frequency signal IF1 into the main screen intermediate frequency processor 102.

At this time, the main screen intermediate frequency processor 102 outputs a combined image signal CVBS1. Therefore, the digital comb filter 103 receiving the combined image signal CVBS1 separates the received signal into a luminance signal Ym and a chrominance signal Cm.

Therefore, the luminance/chrominance switching unit 107 switches the luminance signal Ym and the chrominance signal Cm separated by the digital comb filter 103 and outputs to the image processor 108, so that the primary color signals R, G, B are outputted to the CPT and are displayed on the screen.

In the case of the double windows, the tuner 104 receives the high frequency signal received from the antenna ANT and inputs the intermediate frequency signal IF2 into the sub-screen intermediate frequency processor 105.

At this time, the sub-screen intermediate frequency processor 105 inputs the combined image signal CVBS2 into the double window block 106.

The double window processor 106 receives the combined image signal CVBS2 of the sub-screen intermediate frequency processor 105 and separates the thusly received signal into the luminance signal Yp and the chrominance signal Cp and outputs to the luminance/chrominance switching unit 107.

The luminance/chrominance switching unit 107 receives the chrominance signal Ym and chrominance signal Cm of the digital comb filter 103 and the luminance signal Yp and the chrominance signal Cp of the double window processor 106 and switches each component of the same and outputs one luminance signal Y and one chrominance signal C to the image processor 108.

Therefore, the signals are combined into primary color signals R, G, B by the image processor 108, and are outputted to the CPT and displayed on the double window screen.

In the conventional art, when implementing a double window in the 3-system, the resolution of the images is decreased due to the mismatching of the main image and sub-image.

SUMMARY OF THE INVENTION

Accordingly, it is an object of the present invention to provide a double/multi window processing apparatus for a television system which overcomes the aforementioned problems encountered in the background art.

It is another object of the present invention to provide a double/multi window processing apparatus for a television system which is capable of preventing a synchronous distortion of a main screen image and a sub-screen image in the double/multi window mode by matching the synchronousness of the main screen image and sub-screen image and generating a signal for the double/multi-window image for thereby implementing a clearer image.

It is another object of the present invention to provide a double/multi window processing apparatus for a television system which is capable of judging a corresponding system, removing an interference bit, and stabilizing a synchronousness when there is not a signal when displaying an original screen of the 3-system NTSC-M, PAL-M, PAL-N based on the double/multi-window image.

To achieve the above objects, there is provided a double/multi window processing apparatus for a television system according to a first embodiment of the present invention which includes a first luminance/chrominance separator for separating a combined image signal of a main image outputted from an intermediate frequency processor into a luminance signal and a chrominance signal, a second luminance/chrominance separator for separating the combined image signals of the main image and subimage outputted from the intermediate frequency processor into a luminance signal and a chrominance signal, matching the synchronousnesses of the same, combining the synchronous matched luminance signal and chrominance signal and generating a double window luminance/chrominance signal, and a luminance/chrominance switching unit for switching the luminance and chrominance signals of the first and second luminance/chrominance separator in the double window mode and outputting one luminance and chrominance signal.

To achieve the above objects, there is provided a double/multi window processing apparatus for a television system according to a second embodiment of the present invention which includes a first luminance/chrominance separator for separating a combined image signal of a main image outputted from an intermediate frequency processor into a luminance signal and a chrominance signal, a second luminance/chrominance separator for separating a combined image signal of a main image outputted from the intermediate frequency processor into a luminance signal and a chrominance signal, matching the synchronousnesses of the same, combining the synchronous matched luminance and chrominance signals, and generating a double window luminance/chrominance signal and a multi window primary color signal, a luminance/chrominance switching unit for switching the luminance signal and chrominance signal of the first and second luminance/chrominance separator in the double window mode and outputting one luminance and chrominance signal, an image processor for processing a luminance signal and chrominance signal of the luminance/chrominance switching unit in the double window mode, processing a primary signal of the second luminance/chrominance separator in the multi window mode, and outputting the processed signal to a display unit, a synchronous stabilizer for grounding an external synchronous terminal of the image processor to a ground circuit for stabilizing the synchronousness of the non-signal screen in the double/multi window mode, and a controller for checking the second luminance/chrominance separator and image processor when selecting an auto program or a channel, judging a system information, storing the same, and controlling the operation of each element in accordance with the double/multi window setting.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a table illustrating the codes provided for each system according to the present invention;

FIGS. 4A through 4E are views illustrating the pictures based on a system setting according to the present invention;

DETAILED DESCRIPTION OF THE PREFERRED EMBODIMENTS

Figure 1:
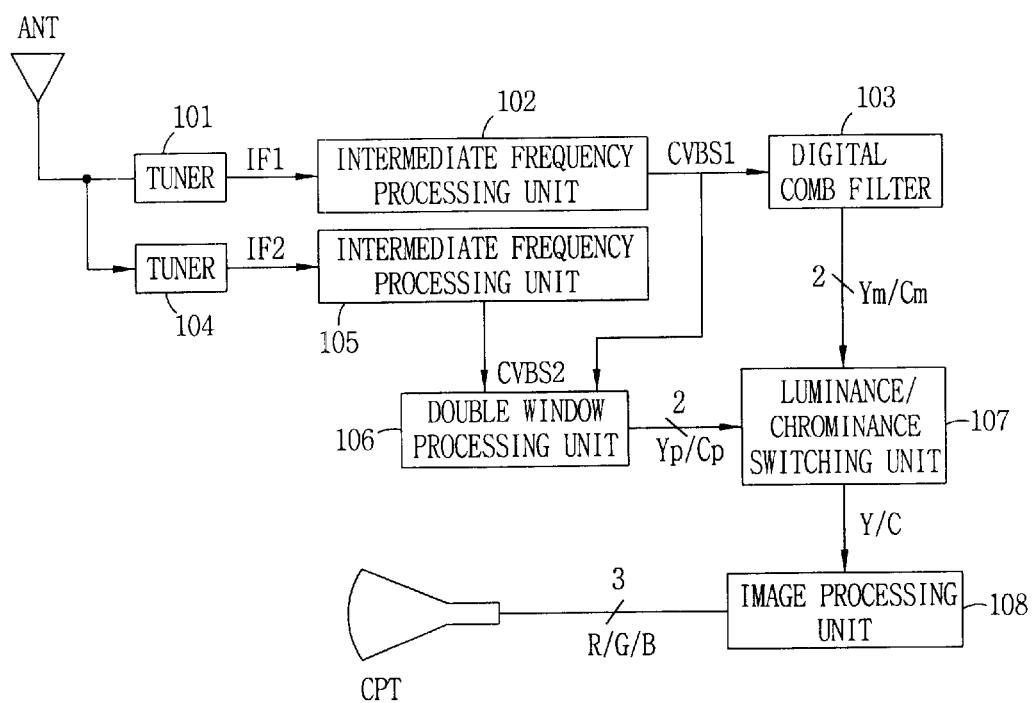
FIG. 1 is a block diagram illustrating a conventional double window processing apparatus.
Figure 2:
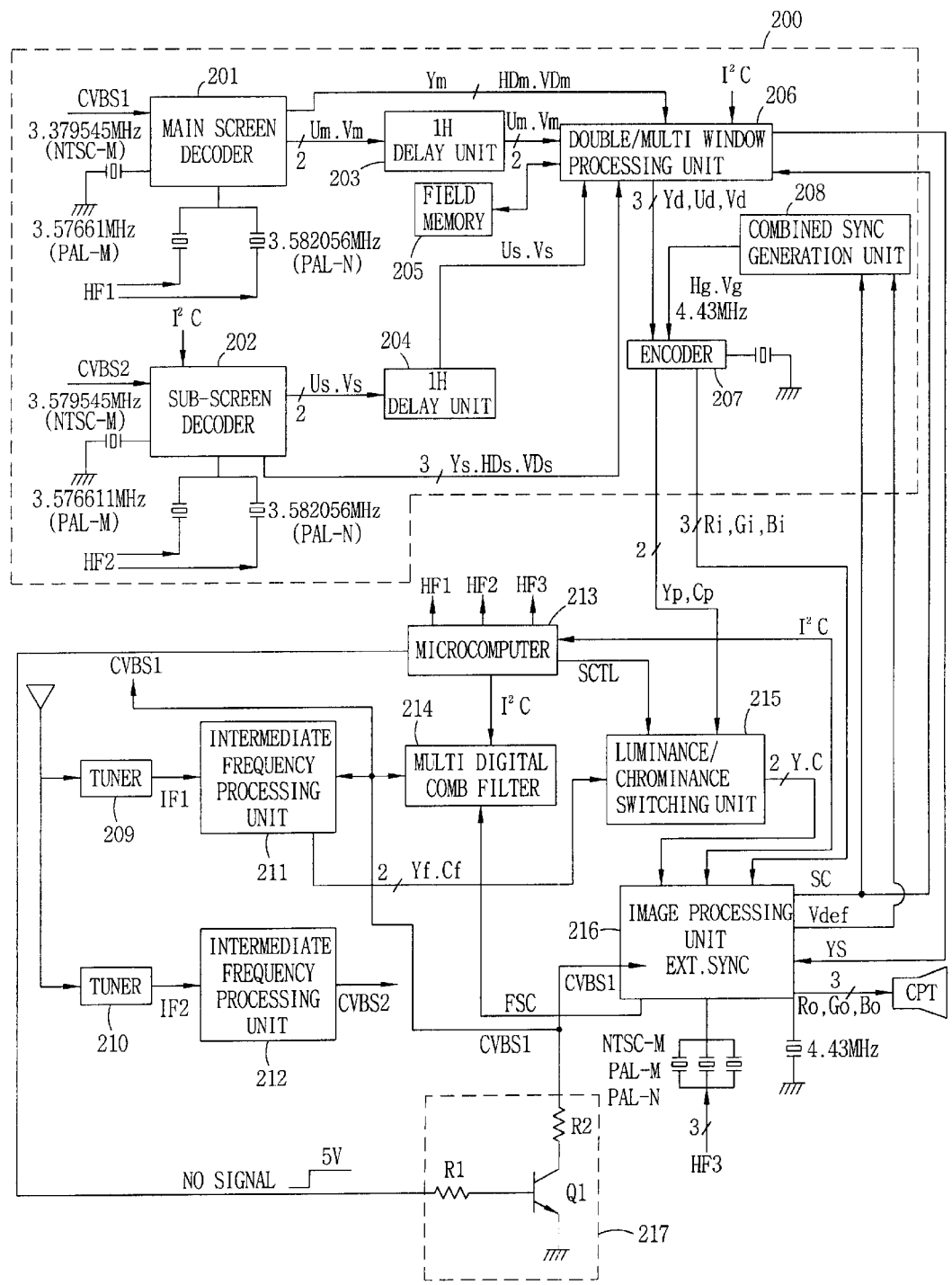
FIG. 2 is a block diagram illustrating a double/multi window processing apparatus according to the present invention.

As shown in FIG. 2, the double/multi-window processing apparatus for a television system according to the present invention included tuners 209 and 210 detecting a signal from an antenna and outputting the intermediate frequency signals IF1 and IF2 of the main image and sub-image, intermediate frequency processors 211 and 212 receiving the main image and sub-image of the tuners 209 and 210 and outputting combined image signals CVBS1 and CVBS2, a multi-digital comb filter 214 separating the combined image signal CVBS1 of the main image outputted from the intermediate frequency processor 211 into a luminance signal Yf and a chrominance signal Cf with respect to one system selected from three systems NTSC-M, PAL-M, and PAL-N, double/multi-window implementation block 200 processing the output signals CVBS1 and CVBS2 of the intermediate frequency processors 211 and 212 for a double window and multi-window and outputting a luminance signal Yp and chrominance signal Cp and primary color signals Ri, Gi, and Bi, a luminance/chrominance switching unit 215 switching the luminance signal Yf and chrominance signal Cf of the main screen in the double window mode and the luminance signal Yp and the chrominance signal Cp of the double window and outputting a luminance signal Y and a chrominance signal C, an image processor 216 processing the output signals from the luminance/chrominance switching unit 215 for a double window mode, generating the output signals Ri, Gi, Bi of the double/multi-window implementation block 200 for setting the multi-window mode, and outputting the primary color signals Ro, Go, Bo to the CPT, a synchronousness stabilizer 217 grounding the output signal from the intermediate frequency processor 211 inputted into to the external synchronous terminal EXT.SYNC of the image processor 216 to the output signal CVBS1 of the intermediate frequency processor 211 for thereby stabilizing the synchronousness of the screen, and a microcomputer 213 checking the double/multi-window implementation block 200 and the image processor 216 when selecting the auto program or the channel, judging and storing the system information, and controlling each element in accordance with the double/multi-window setting.

The double/multi-window implementation block 200 includes main and sub-screen decoders 201 and 202 decoding the combined image signals CVBS1 and CVBS2 of the main and sub-screens to luminance/chrominance signals Ym, Um, Vm and Ys, Us, Vs and outputting synchronous signals HDm, VDm and HDs, VDs, 1 H delay units 203 and 204 delaying the chrominance signals Um, Vm and Us, Vs of the main and sub-screen decoders 201 and 202 by 1 H and removing a cross talk, a field memory 205 digitally processing the chrominance signals Us, Vs of the sub-screen and storing the same, a double/multi-window processor 206 performing an addition or subtraction at the line memory for each component of the luminance signal Ym/chrominance signal Um and Vm of the main screen for the double window setting and the luminance signal Ys/chrominance signals Us, Vs of the sub-screen stored in the field memory 205 for the window image process, sequentially storing into the field memory 205 when setting the multi-window, combining the luminance signal Ys/chrominance signals Us, Vs of the sub-screen of each channel by the number of the multiwindows, and outputting the luminance signal Yd/chrominance signals Ud, Vs, an encoder 207 converting the output signals Yd, Ud, Vd of the double/multi-window processor 206 into the luminance signal Yp/chrominance signal Cp for the double windows having a color burst signal of 4.43 MHz and outputting to the luminance/chrominance switching unit 215, converting the same into the primary color signals Ri, Gi, Bi for the multi-window and outputting to the image processor 216, and a combined synchronous signal generator 208 generating synchronous signals Hg, Vg based on the synchronous signals SC, Vdef outputted from the image processor 216 when there is not a luminance signal Yd from the double/multi-window processor 206 and outputting to the encoder 207.

The operation of the double/multi window processing apparatus for a television system will be explained.

First when the tuners 209 and 210 detect a high frequency signal RF received through an antenna output intermediate frequency signals IF1 and IF2, the intermediate frequency processors 211 and 212 process the intermediate frequency signals IF1 and IF2 and output combined image signals CVBS1 and CVBS2. The multi-digital comb fitter 214 receiving the combined image signal CVBS1 separates the signal into a luminance signal Yf and a chrominance signal Cf and outputs these through the intermediate frequency processor 211 and judges the input signals of the systems NTSC-M, PAL-M, PAL-N and performs the separation operation of the luminance/chrominance signals based on the type of a corresponding system.

In order to judge a predetermined system, the microcomputer 213 transmits a bypass instruction to the multi digital comb filter 214 through an $12_C$ bus for bypassing the combined image signal CVBS1 without the separation operation of the luminance/chrominance signals before the crystal-on initial preparation operation is performed for driving the system.

In addition, in order to judge a predetermined system, the microcomputer 213 turns on/off each crystal and transmits an information to the image processor 216 through the $12_C$ bus so that a color signal sub-carrier Fsc of the switched crystal is outputted to the multi digital comb filter 214, and at the same time, the crystal control information switched by the current image processor 216 is transmitted to the multi digital comb filter 214 through the 12C bus for setting the system in order to implement the luminance/chrominance signal separation.

Thereafter, the microcomputer 213 searches the color judging register provided in the interior of the image processor 216 through the 12C bus.

As a result of the search, if the color register bit is "1", it is judged that the input signal is accurately decoded.

If the color register bit is "0, the microcomputer 213 recognizes that the judgement of the system is wrong, and then the next crystal is switched by controlling the image processor 216.

The microcomputer 213 instructs the multi digital comb filter 214 to perform the luminance/chrominance separation operation based on the same system as the system of the switched crystal.

Thereafter, the search operation that the color judging register provided in the interior of the image processor 216 is repeatedly performed.

However, in the above-described operation, a predetermined delay occurs when switching the channels resulting in a color delay phenomenon in the case that all crystals are sequentially turned on and off.

Therefore, in order to overcome the above-described problems, in the present invention, the microcomputer 213 searches a vertical frequency judging register provided in the interior of the sub-screen decoder 202 through the $12_C$ bus during the operation of the auto program for judging a predetermined system by the channel.

As a result of the search, if the vertical frequency is 50 Hz, the system is recognized as a PAL-N system, and the 3.582056 MHz(PAL-N) adapted to the subscreen decoder 202 is driven for thereby implementing a color decoding operation.

As a result of the search of the vertical frequency judging register, if the vertical frequency is 60 Hz, since the system corresponds to one of the PAL-M and NTSC-M systems, a corresponding system is recognized by sequentially driving each crystal for thereby performing a color decoding operation.

Namely, in the present invention, only the PAL-M and PAL-N crystals among the crystals provided in the main and sub-screen decoders 201 and 202 are designed to be controlled by the microcomputer 213.

The microcomputer 213 drives the 3.576611 MHz PAL-M crystal and automatically searches the internal crystal ports of the decoders 201 and 202, and the crystal port in which the crystal PLL loop of the interior of the double/ multi-window implementation block 200 selects the crystal port in which the signal and color are locked for thereby implementing a color decoding operation.

In the case that a corresponding system crystal driving and multi-signal with respect to a corresponding channel selected during the channel conversion after the auto-program is inputted, when the vertical frequency is 60 Hz, the microcomputer 213 sequentially turns on and off the PAL-M and NTSC-M crystals and controls the luminance/ chrominance separation operation by the system of the multi-digital comb filter 214.

At this time, a predetermined code is allocated to a white/black signal which does not include a color burst because the vertical video frequencies of the NTSC-M and PAL-M are identical, so that the microcomputer 213 may make an error for judging the system.

In particular, even when driving the image processor 216 using an external input, since the color judging register continuously recognizes that there is not color, the microcomputer 213 may repeatedly turn on/off the crystals of the systems of NTSC-M and PAL-M.

Therefore, a predetermined code is provided by the system in the above-described manner. When a user selects a predetermined channel, the microcomputer 213 searches an information stored in a corresponding channel and controls the crystal driving operation and the multi-digital comb filter 214.

At this time, as the user selects a predetermined channel, the microcomputer 213 searches a memory information of a corresponding channel and drives the crystal of a corresponding system, the image processor 216 transmits A color sub-carrier wave frequency Fsc to the multi-digital comb filter 214 based on the reference frequency of the luminance/ chrominance signal separation.

However, before the color sub-carrier wave frequency Fsc is inputted into the multi digital comb filter 214, when a luminance/chrominance separation instruction of a corresponding system inputted from the microcomputer 213 is inputted into the multi-digital comb filter 214, the error of the luminance/chrominance separation may occur.

Therefore, the microcomputer 213 waits for a predetermined time after a corresponding crystal is driven.

In addition, after the software-based process is finished, a predetermined time is required for searching the color judging register of the image processor 216 because the time is required until the luminance and chrominance signals Yf, Cf separated from the multi digital comb filter 214 are sequentially inputted into the intermediate frequency processor 211 and the luminance/chrominance switching unit 215, and the image processor 216 drives a color PLL system and combines the colors.

If the operation for searching the color register of the image processor 216 is too fast, it is judged that there is not a color, so that the system judging error may occur in the microcomputer 213.

Therefore, it is impossible to combine the color images with respect to the selected channel by driving other crystal.

The system judging process that the user selects an auto program or a direct channel in the system by the region will be explained as follows.

1. The microcomputer 213 stores the information by the judged channel into the register of the microcomputer by searching the vertical frequency judging register of the subscreen decoder 202 through the 12C.
2. When the user selects a predetermined channel, the microcomputer 213 searches an internal register and reads a corresponding channel information.
3. The microcomputer 213 drives a crystal of the selected system among the crystals provided in the image processor 216 using a searched information.
4. The microcomputer 213 waits until the color subcarrier wave frequency Fsc is inputted from the image processor 216 into the multi-digital comb filter 214.
5. The microcomputer 213 transmits an instruction in order for the multi-digital comb filter 214 to perform a luminance/chrominance isolation based on the selected system.
6. The microcomputer 213 switches the luminance/chrominance switching unit 215 in order for the luminance Yf and chrominance Cf signals of the original screen to be inputted into the image processor 325 and waits until the luminance Yf and chrominance Cf signals separated by the multidigital comb filter 214 reaches the imaged processor 216, and then the color is locked.
7. The microcomputer 213 searches the internal color register of the image processor 216 and judges whether or not there is a color signal.
8. As a result of the judgement, if it is judged that there is a color signal, the microcomputer 213 judges that the system (for example, NTSC-M) is identical with the system of the selected channel, for thereby stopping the driving operation of the crystal.
9. If it is judged that there is not a color as a result of the search, the microcomputer 213 returns to the step 2 and searches the vertical frequency bit of the internal register of the sub-screen decoder 202 for judging the system.

If the frequency is 60 Hz, it is judged that the NTSC-M system is driven in the step 3, and then the PAL-M is driven, and the steps are repeatedly performed from the steps 1 to 7. If the frequency is 50 Hz, it is judged that the system is the PAL-M in which there is not a color burst, so that the system judging operation is stopped.

10. As a result of the search with respect to the NTSC-M, PAL-M, and PAL-N systems, if it is judged that there is not a color, the current signal corresponds to the channel in which there is a color stored when the initial auto program or the direct channel is selected.

Namely, it is judged that the black and white signal is transmitted from the broadcasting station, so that the microcomputer 213 provides a code '1110" to the internal register with respect to the currently selected channel for thereby stopping the judging operation of the system.

Therefore, the microcomputer 213 stores a predetermined code into the internal memory with respect to the system selected based on the channel. The stored data includes a channel information, a vertical frequency information, a system color type information, a color burst information, etc.

For example, the codes such as 60 Hz: 0, 50 HZ: 1, NTSC: 0, PAL: 1, color burst: 1, and non-color burst: 0 are provided in accordance with the type of the system, the codes such as NTSC:001, PAL-M:011, PAL-N:111, non-signal:000, non-color burst signal:110 are provided.

These codes by the system are shown in FIG. 3.

In addition, in the double/multi window implementation block 200, the combined image signals CVBS1 and CVBS2 outputted from the intermediate frequency processors 211 and 212 are inputted into the main screen decoder 201 and the sub-screen decoder 202.

The microcomputer 203 drives the crystals of the main and sub-screen decoders 201 and 202.

At this time, the main and sub-screen decoders 201 and 202 receive the memory information of the microcomputer 213 through the J2 C and divides the combined image signals CVBS1 and CVBS2 into the luminance and chrominance signals Ym, Um, Vm and Ys, Us, Vs based on the type of a corresponding system. The luminance signals Ym and Ys from the main and subscreen decoders 201 and 202 are directly inputted into the double/multi window processor 206, and the chrominance signals Um, Vm and Us, Vs are inputted into the double/multi window processor 206 through the 1 H delay units 203 and 204.

Since the 1 H delay units 203 and 204 have a comb filter characteristic, the 1 H delay units 203 and 204 are used for removing a distortion, an interference noise, etc. due to the PAL signal.

In particular, since the polarity of the PAL signal is inverted and then is transmitted for each neighboring line, the screen distortion due to the phase distortion is corrected by adding the signal which is delayed by 1 H and the non-delayed signal or subtracting the 1H delayed signal from the non-delayed signal for thereby removing an interference noise, etc. from the luminance signal Y, so that the sharpness and resolution of the image are improved.

The main and sub-screen decoders 201 and 202 include a color register and a vertical frequency judging register. The microcomputer 213 searches the states of the register provided in the main and sub-screen decoders 201 and 202 in the case that the color burst signal is not transmitted from the broadcasting station differently from the channel information stored in the internal register, and the data stored in the internal register are re-stored as a new system information.

At this time, the double/multi window processor 206 combines the luminance signal Ym and chrominance signals Um and Vm of the main screen as a double window image using the internal line memory and stores the luminance signal Ys and chrominance signals Us and Vs of the sub-screen into the external memory 205 and combines the same as a double window image and multi window image.

A reference signal of a write time and read time of the memory is used so that the double/multi window processor 206 generates a signal for the double/multi window image.

As the write time reference signal, the synchronous signals HDm, VDm and HDs, VDs of the main and sub-screen outputted from the main and sub-screen decoders 201 and 202 are inputted, and as the read time reference signal, the synchronous signal (SC: Synchronous Pulse) outputted from the image processor 216 is inputted.

The synchronous signals HDm, VDm and HDs, VDs of the main and sub-screen screens are the signals locked by the combined image signals CVBS1 and CVBS2 inputted into the main and subscreen decoders 201 and 202 and the internal synchronous PLL loop.

The horizontal synchronous signal Vdef outputted from the deflection unit of the image processor 216 may be used for the read time.

Since this synchronous signal Vdef includes a noise of the deflection unit, the primary color signals Ro, Go and Bo outputted to the CPT by the deflection unit of the image processor 216 are synchronized with the vertical and horizontal frequencies of the deflection unit, so that the synchronous signal SC is used for improving the jitter noise in the horizontal direction in the multi window image and double image.

Therefore, it is possible to implement a horizontal position movement of the image in the double window state.

At this time, the encoder 207 changes the luminance signal Yd and chrominance signals Ud and Vd outputted from the double/multi window processor 206 to the luminance signal Yp and chrominance signal Cp for the double window image process based on the synchronous signals Hg and Vg of the combined synchronous signal generator 208 and outputs to the luminance/chrominance switching unit 215.

In addition, the thusly changed signals are changed to the primary color signals Ri, Gi and Bi, and the primary color signals are outputted to the image processor 216 together with the signal YS as much as the width of the multi window image outputted from the double/multi window processor 206.

The encoder 207 adapts a PAL system in which the color burst frequency is 4.43 MHz.

The luminance/chrominance switching unit 215 switches the luminance, chrominance signals Yf, Cf and Yp, Cp in accordance with a control of the microcomputer 213 based on the original screen and double windows selected by the user and outputs the switched signals to the image processor 216.

Since there are not a luminance signal Yd and chrominance signals Ud and Vd of the double/multi window processor 206, the combined synchronous signal generator 208 is used for matching the synchronousnesses.

At this time, the combined synchronous signal generator 208 receives the synchronous pulse SC of the image processor 216 and the vertical synchronous signal Vdef of the deflection unit which are matched with the main screen signals as a reference synchronous signal and outputs synchronous signals Hg and Vg to the endorser 207.

Here, the vertical synchronous signal Vdef of the deflection unit may not be used for the reason that the combined image signal CVBS1 of the main screen outputted from the intermediate frequency processor 211 is inputted into an external synchronous port EXT.SYNC of the image processor 216 for matching the synchronousness of the double/multi window image and the synchronousness of the internal deflection.

Therefore, the image processor 216 uses the combined image signal CVBS1 inputted into the external synchronous port EXT.SYNC as a synchronous signal of the deflection unit through an internal vertical and horizontal filter for thereby matching the synchronousness of the double/multi window images.

In order to quickly display the double window image and multi window image in accordance with the selected channel without a predetermined delay, the channel information is stored into the microcomputer 213, and the double window and multi window image data are previously stored.

The data format of the double window image by the system is shown in FIG. 4A.

The data format 2 as shown in FIG. 4C is directed to displaying the NTSC-M system on the main screen and the PAL-N system on the sub-screen.

Since the main screen has 525 lines, the upper and lower 100 lines among 625 lines of the sub-screen are lost.

The data format 3 as shown in FIG. 4D is directed to displaying the PAL-N system on the main screen and the NTSC-M system on the sub-screen.

Since the main screen has 625 lines, and the sub-screen has 525 lines, the data format 3 corresponds to the compressed image.

Therefore, the format selected among the four formats as shown in FIG. 4 is controlled by the double/multi window processor 206 in accordance with the user's selection of the system of the main screen.

In the multi window data format, various screen data formats such as four-screen, 8-screen, and 9-screen are formed using the double/multi window processor 206 and the memory 205, and the data of the user's format is displayed based on the 12C between the microcomputer 213 and the double/multi window processor 206.

The process for driving the double/multi window implementation block 200 will be explained as follows.

1. The microcomputer 213 searches the vertical frequency judgement register of the sub-screen decoder 202 through the I²C and stores each information obtained by the system type into the register of the microcomputer 213.
2. When a user selects a predetermined channel, the microcomputer 213 searches its internal register in accordance with the selection channels of the main and sub-screen decoders 201 and 202 and reads a corresponding channel.
3. The microcomputer 213 drives the crystal of the first selected system among the crystals of each system provided in the main and sub-screen decoders 201 and 202 using the searched information.

At this time, the main and sub-screen decoders 201 and 202 judge only the PAL-M and PAL-N signals.

Therefore, the only vertical frequency bit is searched from the internal register of the microcomputer 213 for thereby performing a signal judgement, so that the judging speed of the system is increased.

4. The microcomputer 213 waits until the internal color register of the main and sub-screen decoders 201 and 202 is operated.
5. The microcomputer 213 searches the internal color register of the main and sub-screen decoders 201 and 202.
6. As a result of the search, if there is a color, the microcomputer 213 processes the eighth step (8).
7. As a result of the search, if there is not a color, the microcomputer 213 repeats the second step (2), and the vertical frequency bit of the internal register of the main and sub-screen decoders 201 and 202 is re-searched.

If the searched vertical frequency is 60 Hz, the third through fifth steps are re-performed. performed.

In this state, if it is judged that there is not color, it means that the current signal does not corresponds to the channel having a stored color when selecting the auto program or the direct channel.

Namely, it is judged that the black/white signal is transmitted from the broadcasting station, so that the microcomputer 213 performs the eighth step (8) after providing a predetermined code of "110" to the internal register.

8. The microcomputer 213 transmits four data formats of the double window or the format selected among the multi window data to the double/multi window processor 206 through the 12C.
9. The user selects an external synchronous port EXT.SYNC of the image processor 216 for stabilizing the screen when the user selects the double window function.

10. The microcomputer 213 allows the crystal port of the image processor 216 to select 4.43 MHz so that the encoder 207 performs a color decoding operation based on the 4.43 MHz PAL system.

11. When the microcomputer 213 selects a double window image luminance signal Yp and chrominance signal Cp by controlling the luminance/color switching unit 215, the image processor 216 performs the color decoding based on the PAL system and outputs the primary color signals Ro, Go and Bo to the CPT.

The color burst signal of 4.43 MHz is converted into the color signal of a new PAL system for removing a color interference between three system signals(NTSC-M, PAL-M and PAL-N).

Namely, it is possible to prevent a degradation of the screen due to the interference bit between the color burst signals of each system and the crystal signals. provided in the main and sub-screen decoders 201 and 202.

In addition, the color burst frequency of each of the systems NTSC-M, PAL-M, and PAL-N is 3.579545 MHz, 3.576611 MHz, and 3.582056 MHz, respectively.

In this case, the difference bit of the frequency becomes a cause of a degradation or noise of the screen when implementing a double window or a multi window.

Therefore, the combined double window or the multi window signal is encoded based on the PAL type having a color burst of 4.43 MHz, so that the degradation or noise of the screen is prevented using the large difference of the color carrier frequencies of three systems, which is not recognized by a human.

In addition, the synchronous signal Hg matching with the horizontal synchronous signal of the main screen is used for determining the color burst position of the chrominance signal Cp outputted from the encoder 207.

This synchronous signal Hg is generated by the combined synchronous signal generator 208.

The combined synchronous signal generator 208 receives a pulse SC and a vertical synchronous signal Vdef outputted from the image processor 216.

At this time, the input of the vertical synchronous signal Vdef is not important for the reason that the decoder 207 applies the asynchronous luminance signal Yd and chrominance signals Ud and Vd to the luminance/chrominance switching unit 215, and the luminance/chrominance switching unit 215 generates a luminance signal Y and a chrominance signal C and outputs to the image processor 216, and the image processor 216 matches the thusly received signals with the horizontal synchronous signal of the combined image signal CVBS1 of the main screen received through the external synchronous port EXT.SYNC for thereby implementing a color demodulation at an accurate color burst position.

The combined synchronous signal generator 208 generates the synchronous signals Hg and Vg having a predetermined duty ratio used for the encoder 207 and the rising timing which is matched with the vertical synchronous signal Vdef using the mono multi-vibrator.

Figure 5A:
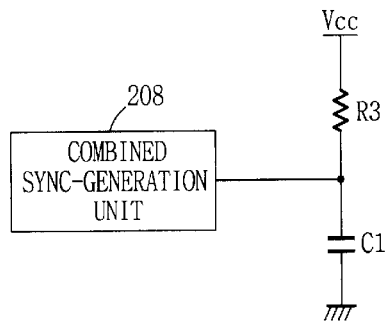
FIG. 5A is a circuit diagram illustrating a peripheral circuit of the combined synchronous signal generator of FIG. 2.
Figure 5B:
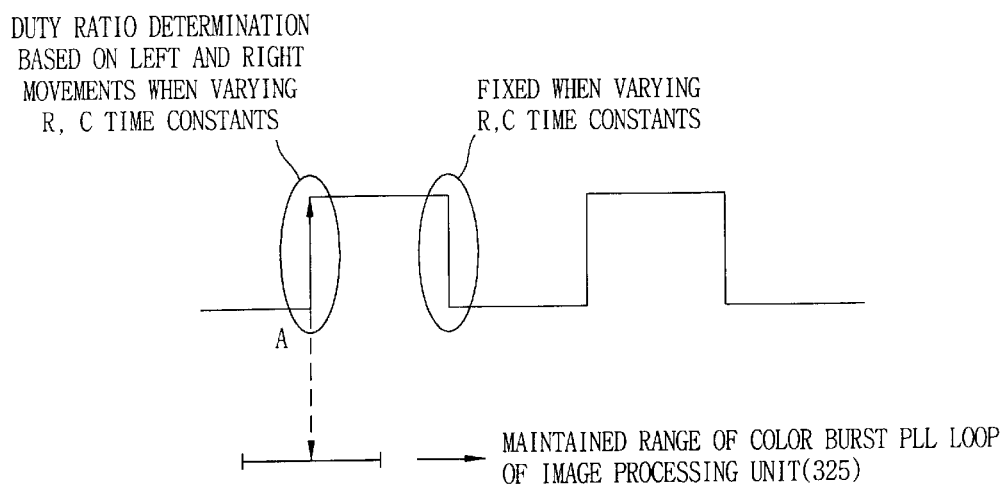
FIG. 5B is a wave form diagram illustrating a time constant determination of the combined synchronous signal generator of FIG. 2.

The width of the pulse of the synchronous signals Hg and Vg are determined in accordance with the time constant of the resistor R3 and the Condenser C1 as shown in FIG. 5A.

In this case, the rising timing of the pulses Hg and Vg is important because the color combined signal is not formed if the range of the internal PLL of the crystal port of the image processor 216 is not defined.

Therefore, the resistor R3 and condenser C1 having a low variation width based on temperature are used.

However, as the values of the resistor R3 and the condenser C2 are varied; the time constant is varied, so that the position of the rising timing of the pulses Hg and Vg is changed.

Therefore, the time constant is determined so that the position of the rising timing of the same is positioned at the center in the entire time interval with the color on the screen by varying the time constant.

Namely, in the case that the time constant of the resistor R3 and the condenser C1 is varied, the rising timing of the synchronous signals Hg and Vg generated by the combined synchronous signal generator 208 is moved in the leftward or rightward direction about the center of the color burst PLL of the image processor 216 for thereby determining the duty ratio of the synchronous signals Hg and Vg, and the falling timing of the synchronous signals Hg and Vg is fixed.

In addition, the main screen is in the non-signal state in the double window and multi window image signals inputted into the image processor 216, a non-signal is inputted into the external synchronous port EXT.SYNC of the image processor 216.

At this time, the horizontal and vertical synchronous signals outputted from the image processor 216 become unstable due to the noise contained in the non-signal.

The above described unstable state may affect the double/multi window processor 206 and the combined synchronous signal generator 208 which use the above-described synchronous signals, the encoder 207 using the synchronous signal generated by the combined synchronous signal generator 208, and luminance signal Yp, the chrominance signal Cp, and the multi window primary color signals Ri, Gi and Bi outputted from the encoder 207 for thereby causing an unstable and distorted screen.

Therefore, the microcomputer 213 outputs a high level signal to a synchronous stabilizer 217 when judging the nonsignal by the channel, so that the resistance value at the collector of the transistor Q1 becomes low for thereby removing the non-signal noises inputted into the external synchronous port EXT.SYNC of the image processor 216.

The image processor 216 judges that there is not a signal inputted into the external synchronous port EXT.SYNC for thereby stabilizing the system based on the free-running oscillation.

In addition, in the microcomputer 213, when a user selects one among the multi windows, the previously formatted multi-window data are transmitted to the double window processor 206 through the 12C, and the double/multi window processor 206 outputs the luminance signal Yd and the chrominance signals Ud and Vd to the encoder 207 and at the same time outputs the signal YS to the image processor 216 as much as the sized of the upper and lower portions in the multi window images.

At this time, the encoder 207 receives the luminance signal Yd and the chrominance signals Ud and Vd and outputs the primary color signals to the image processor 216.

The image processor 216 carries the multi window signals Ri, Gi, Bi of the primary color signal type on the luminance signal Yf and chrominance signal Cf outputted from the multi digital comb filter 214 as the original screen.

The image processor 216 processes the luminance components of the original screen behind the multi window signals Ri, Gi and Bi based on the speed modulation.

Therefore, when the horizontal width of the multi window image is 1 H interval, the shadow is formed on the image behind the multi window image.

Therefore, when separating the luminance signal Yf and chrominance signal Cf from the multi digital comb filter 214, "4Fsc" of the color sub-carrier wave frequency is selected, so that the luminance/chrominance signals of the original screen are not separated for thereby removing a high band component and outline component.

In this case, since the synchronousness is destroyed in the luminance component of the original screen inputted into the image processor 216, and the multi window image is not displayed, in the case that the horizontal width of the multi window image is 1 H interval, the external synchronousness EXT.SYNC is used for matching the synchronousness.

The synchronous signals inputted into the image processor 216 for implementing double window and multi window images are as follows.

Double window image: combined image signal CVBS1 Multi-window image (original screen PIP, four screens) luminance signal of the original screen Multi window image (8, 9 screens having horizontal width of 1 H): combined image signal CVBS1.

Therefore, the image processor 216 outputs the primary color signals Ro, Go and Bo to the CPT in accordance with a synchronous signal.

As described above, in the present invention, it is possible to display the same size screens and to implement a clean image by matching the synchronousnesses of two image signals.

In addition, when implementing the double/multi window image of three systems, a corresponding system is judged, and then a delaying phenomenon and a color interference between the signals are removed, and the degradation of the screen is removed.

The present invention is adapted to the signal judgement of the multi image signal and the double/multi window image implementation apparatus using the TV and VCR as a medium.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In a television (TV) system, a double window processing apparatus, comprising:

a first luminance/chrominance separation means for separating a combined image signal of a main image outputted from an intermediate frequency processing means into a luminance signal and a chrominance signal;

a second luminance/chrominance separation means for separating the combined image signal of the main image and a combined image signal of a subimage outputted from the intermediate frequency processing means into a luminance signal and a chrominance signal, matching the synchronousnesses of the same, combining the synchronous matched luminance signal and chrominance signal and generating a double window luminance/chrominance signal; and a luminance/chrominance switching means for switching the luminance and chrominance signals of the first and second luminance/chrominance separation means in a double window mode and outputting one luminance and chrominance signal.

2. In a television (TV) system, a double/multi window processing apparatus, comprising:

a first luminance/chrominance separation means for separating a combined image signal of a main image outputted from an intermediate frequency processing means into a luminance signal and a chrominance signal;

a second luminance/chrominance separation means for separating the combined image signal of the main image and a combined image signal of a subimage outputted from the intermediate frequency processing means into a luminance signal and a chrominance signal, matching the synchronousness of the same, combining the synchronous matched luminance and chrominance signals, and generating a double window luminance/chrominance signal and a multi window primary color signal;

a luminance/chrominance switching means for switching the luminance signal and the chrominance signal of the first and second luminance/chrominance separation means;

an image processing means for processing the luminance signal and the chrominance signal of the luminance/chrominance switching means in a double window mode, processing a primary signal of the second luminance/chrominance separation means in a multi window mode, and outputting the processed signal to a display means;

a synchronous stabilizing means for grounding an external synchronous terminal of the image processing means to a ground circuit for stabilizing the synchronousness of a non-signal screen in the double/multi window mode; and a control means for checking the second luminance/chrominance separation means and image processing means when selecting an auto program or a channel, judging a system information, storing the same, and controlling the operation of each means in accordance with a double/multi window setting.

3. The apparatus of claim 2, wherein said second luminance/chrominance separation means includes:

main and sub-screen decoders for separating the combined image signals of a main screen and a sub-screen into a luminance signal and a chrominance signal and outputting a synchronous signal;

first and second delay units for delaying the chrominance signals of the main and subscreen decoders by 1 H and removing a cross talk;

a field memory for digitally processing the chrominance signal of the sub-screen and storing the same;

a double/multi window processor for adding or subtracting the components of the luminance/chrominance signal of the main screen and the luminance/chrominance signal of the sub-screen stored in the field memory when setting the double window for thereby performing a double window image process, combining the luminance/chrominance signals of the sub-screen of each channel by the number of multi windows sequentially stored in the field memory in the multi window setting mode, and outputting a luminance/chrominance signal;

an encoder for converting the luminance/chrominance signal of the double/multi window processor into a double window luminance/chrominance signal having a color burst signal of 4.43 MHz, outputting the converted signal to the luminance/chrominance switching means, converting the same into the multi window primary color signal and outputting to the image, processing means; and a combined synchronous signal generator for generating a vertical and horizontal synchronous signal based on a synchronous signal outputted from the image processing means when there is not a luminance signal outputted from the double/multi window processor and outputting the thusly generated signal to the encoder.

4. The apparatus of claim 3, wherein said combined synchronous signal generator is capable of generating a synchronous signal having a rising timing which is matched with the center of the maintaining range of a color burst PLL for determining the position of a color burst signal outputted from the encoder.

5. The apparatus of claim 2, wherein said image processing means receives the combined image signal of a main screen in the double window mode and the multi window mode having a horizontal width of 1 H and the luminance signal of an original screen in a 4-screen multi window for thereby matching the synchronousnesses of the main and original screens.

6. The apparatus of claim 2, wherein said control means stores the data format by the system and outputs a data of a corresponding system to the double/multi window processing apparatus when setting the double/multi window.

7. The apparatus of claim 2, wherein said control means searches a color register provided in the interior of the image processing means and searches a vertical frequency register provided in the interior of a sub-screen decoder when there is a color as a result of the search.

* * * * *